Sept. 29, 1936. J. F. PIERSON ET AL 2,056,124
IMPROVED NURSING BOTTLE
Filed Feb. 12, 1935
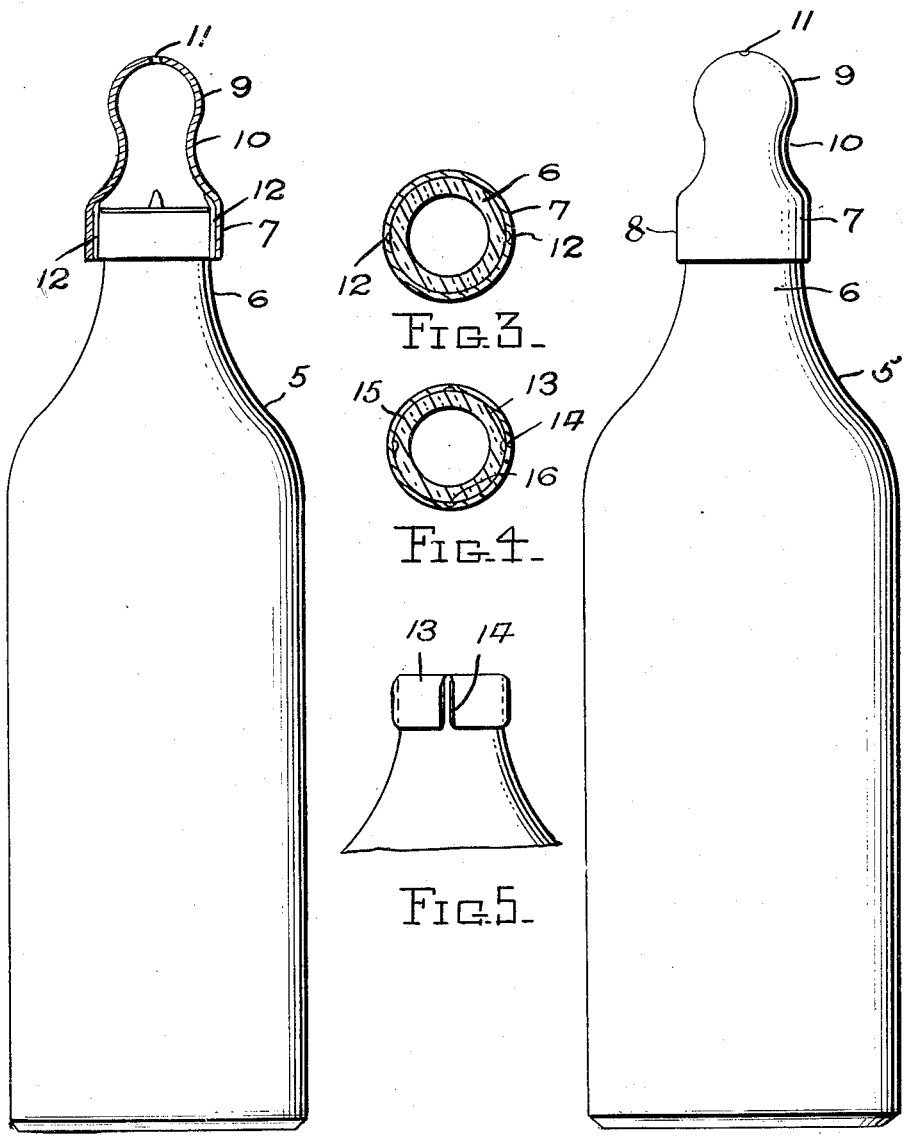
John F. Pierson
Hilda E. Krug
INVENTORS Patented Sept. 29, 1936

2,056,124

UNITED STATES PATENT OFFICE 2,056,124

IMPROVED NURSING BOTTLE

John F. Pierson and Hilda E. Krug, White Plains, N. Y.

Application February 12, 1935, Serial No. 6,182

1 Claim. (Cl. 215—11)

Our invention relates to improvements in nipples for nursing bottles and in combined nursing bottles and nipples, and its leading object is to provide a nipple or a combined nipple and nursing bottle, which will function to prevent the collapse of the nipple, when the nursing child or infant is drawing upon the contents of the bottle.

The invention is embodied in a nipple having a bottle neck gripping portion formed with one or more internal grooves or passages, which are relatively small, through which air may be drawn at all times, but in such small quantity that the suction action developed by the infant upon the contents of the milk bottle will not be impaired, while this admission of small flow of air will prevent the nipple from collapsing.

Another object of the invention is the provision of a nursing bottle formed with one or more external air grooves, which are enclosed by the elastic skirt or gripping portion of the nursing nipple, so that a small internal flow of air from outside of the bottle into the nipple will be permitted, and excessive suction by the infant will be prevented.

With the above and other objects in view the invention consists in certain new and useful constructions, combinations and arrangements of parts, clearly described in the following specification, and fully illustrated in the accompanying drawing, in which:

Fig. 1 is a side view of a nursing bottle, showing the nipple in vertical section.

Fig. 2 is a side elevation thereof.

Fig. 3 is a transverse sectional view, taken on line 3—3 of Fig. 2, looking in the direction of the arrows.

Fig. 4 is a similar view, taken on line 4—4 of Fig. 2, looking in the direction of the arrows.

Fig. 5 is a detail side view showing the neck of a bottle, the lower portion being broken away for convenience, formed with external air grooves.

Referring to the drawing illustrating our invention 5 designates a nursing bottle, formed with a neck 6, on which the elastic skirt or sleeve 7 of the rubber nipple 8 is stretched.

The nipple 8 is formed with a semi-spherical end portion 9 and a downwardly flaring intermediate portion 10. The former may be formed with one or more outlet holes 11, to permit the discharge of the milk into the mouth of the nursing infant.

The nipple 8 is formed with one or more internal grooves 12, which are narrow and shallow, and which form, when the nipple is attached to the neck of the bottle, small passages to permit of a slight inflow of air, from outside of the bottle to the interior of the nipple, when the nursing infant is drawing upon the nipple. Due to the normal cylindrical construction of the bottle neck these fine air grooves will not be closed when the nipple is stretched over the neck of the bottle.

The small grooves 12 are of such restricted size as to function wholly as capillary passages. They will permit the flow of a small amount of air between the nipple and the bottle, and will prevent the flow of an excess amount of air to the bottle and nipple. By preventing the admission of an excess amount of air to the nipple, the delivery of milk is not prevented. Also the milk is prevented from spilling between the nipple and the bottle neck, at any time, as the small amount of moisture which normally fills the grooves restricts the inflow of air and prevents the free flow of milk, except when suction is developed.

As the milk contents of the bottle are drawn up by the nursing infant and the bottle is emptied, or the level of the bottle changes so that the milk is no longer flowing into the nipple, the infant continues to draw for milk, and this effort results in the collapse, normally, of the nipple, as the air pressure within the bottle is reduced. If this effort is continued by the nursing infant for any considerable time colic and other complications may result.

With our improved nipple a slight flow of air is permitted into the nipple, from outside of the bottle, which is sufficient to prevent collapse of the nipple, as at no time will the air pressure within the bottle drop below that of the surrounding atmosphere. This inflow of air into the nipple will not, however, impair the outflow of milk, when the milk fills the nipple, and the small air grooves are found in actual use to not permit the lateral leakage of milk, or other contents of the bottle.

We may also form the air relieving grooves in the external surface of the bottle neck, as shown in Figs. 4 and 5, wherein the bottle neck 13 is formed with one or more narrow air grooves 14, which are enclosed by the elastic sleeve or skirt 15 of the nipple, which may also be formed with one or more air grooves, indicated at 16.

The improved nipple will be made of rubber of high quality, which will permit of it being thoroughly sterilized. The improved nipple does not increase the cost of manufacture, and very greatly increases the practical service desired.

The nipple may be removed in the ordinary manner, and when removed the nipple and the bottle may be as easily cleaned as with the conventional nipple.

The air groove 12 of the nipple is formed by reducing the thickness of the wall, thus increasing the flexibility of the wall at the location of the groove, so that the wall of the nipple is thereby weakened so that it will expand more readily to take care of slight variations of pressure developed by the action of the air flowing through the hair like groove thus formed.

Having described our invention we claim:—

In combination, a nursing bottle having an external neck shoulder provided with a fine capillary air passage extending from the base of said shoulder to the upper end of the bottle neck, and an elastic rubber nipple provided with a skirt stretched over the shoulder and having its lower end disposed flush with the lower end of the shoulder, said nipple being formed with a rounded upper end having an outlet opening and a contracted intermediate portion overlying the upper end of the bottle neck, the wall of the nipple being weakened to provide for a fine capillary opening extending above the bottle neck and terminating with the lower end of the neck shoulder, both of said grooves being wholly concealed by the nipple, the nipple being weakened at the location of said groove thus providing a thin flexible yielding wall portion adapted to yield when a strong suction is produced in the bottle, the nipple being adapted to be turned on the bottle neck so that its internal capillary passage may be partially or fully registered with the capillary passage of the bottle neck shoulder to vary the capacity of the registering grooves.

JOHN F. PIERSON.
HILDA E. KRUG.